United States Patent [19]

Adamek et al.

[11] Patent Number: 4,796,121
[45] Date of Patent: Jan. 3, 1989

[54] TEMPERATURE-COMPENSATED HEAD POSITIONING DEVICE FOR MAGNETIC DISC STORE

[75] Inventors: Manfred Adamek, Kirchen-Freusburg; Klaus Rinneburger, Wilnsdorf; Peter Schattmann, Siegen, all of Fed. Rep. of Germany

[73] Assignee: U.S. Philips Corporation, New York, N.Y.

[21] Appl. No.: 837,869

[22] Filed: Mar. 5, 1986

Related U.S. Application Data

[63] Continuation of Ser. No. 415,516, Sep. 7, 1982, abandoned.

[30] Foreign Application Priority Data

Mar. 13, 1982 [DE] Fed. Rep. of Germany ....... 3209243

[51] Int. Cl.⁴ .................. G11B 5/012; G11B 5/54; G11B 21/22; G11B 5/016
[52] U.S. Cl. .................. 360/78.13; 360/105; 360/137; 360/97.02; 165/185
[58] Field of Search .................. 360/47–99, 360/137, 133, 75, 104; 228/59; 310/85, 89, 64; 308/DIG. 14; 357/74; 384/279; 165/185, DIG. 8; 244/158 A, 117 A

[56] References Cited

U.S. PATENT DOCUMENTS

| 2,715,518 | 8/1955 | Bickler | 165/185 |
|---|---|---|---|
| 3,200,296 | 8/1965 | Bruestle | 165/185 |
| 3,548,928 | 12/1970 | Kesten | 165/185 |
| 3,678,481 | 7/1972 | Dalziel et al. | 360/133 |
| 3,710,357 | 1/1973 | Buslik | 360/97 |
| 3,723,980 | 3/1973 | Gabor | 360/97 |
| 3,824,684 | 7/1974 | Wheeler | 310/64 |
| 3,825,951 | 7/1974 | Katsumori et al. | 360/133 X |
| 3,949,425 | 4/1976 | Perret et al. | 360/85 |
| 4,151,547 | 4/1979 | Rhoades et al. | 165/185 |
| 4,164,769 | 8/1979 | Kaseta et al. | 360/106 X |
| 4,191,240 | 3/1980 | Rule et al. | 165/185 |
| 4,244,098 | 1/1987 | Barcus | 165/185 |
| 4,299,715 | 11/1981 | Whitfield et al. | 165/DIG. 8 |
| 4,306,259 | 12/1981 | Saito et al. | 360/133 |
| 4,384,610 | 5/1983 | Cook et al. | 165/185 |
| 4,445,157 | 4/1964 | Takahashi | 360/97 |
| 4,456,937 | 6/1984 | Iftikar et al. | 360/106 |
| 4,523,240 | 6/1985 | Dunstan et al. | 360/97 |

FOREIGN PATENT DOCUMENTS

| 0055568 | 7/1982 | European Pat. Off. | 360/137 |
|---|---|---|---|
| 54-55413 | 2/1979 | Japan | 360/98 |
| 0563472 | 1/1981 | Japan | 360/137 |
| 58-45675 | 3/1983 | Japan | 360/137 |
| 58-77065 | 5/1983 | Japan | 360/105 |
| 2062365 | 5/1981 | United Kingdom | 384/905 |

OTHER PUBLICATIONS

"Elementary Classical Physics", vol. 1, 7th Printing, Jan. 1971, pp. 485, 574–575, by Weidner et al. (Text Book).

IBM Technical Disclosure Bulletin, vol. 8, No. 1, Jun. 1965, p. 206, "Heat Conductive Washer", by Donegan et al.

Primary Examiner—Stuart N. Hecker
Assistant Examiner—Alfonso Garcia
Attorney, Agent, or Firm—F. Brice Faller

[57] ABSTRACT

The positioning device for the magnetic head (14) of a magnetic disc store (1) is constructed so that the heat produced by the stepping motor (6) has no significant influence on the magnetic-head support (2). For this purpose the stepping motor (6) is arranged on a mounting plate (5) made of a material with a low thermal expansion coefficient. This mounting plate (5) is secured to the chasis (3) of the drive mechanism. Between the stepping motor (6) and mounting plate (5) a foil (8) with satisfactory heat-sinking properties is arranged.

4 Claims, 1 Drawing Sheet

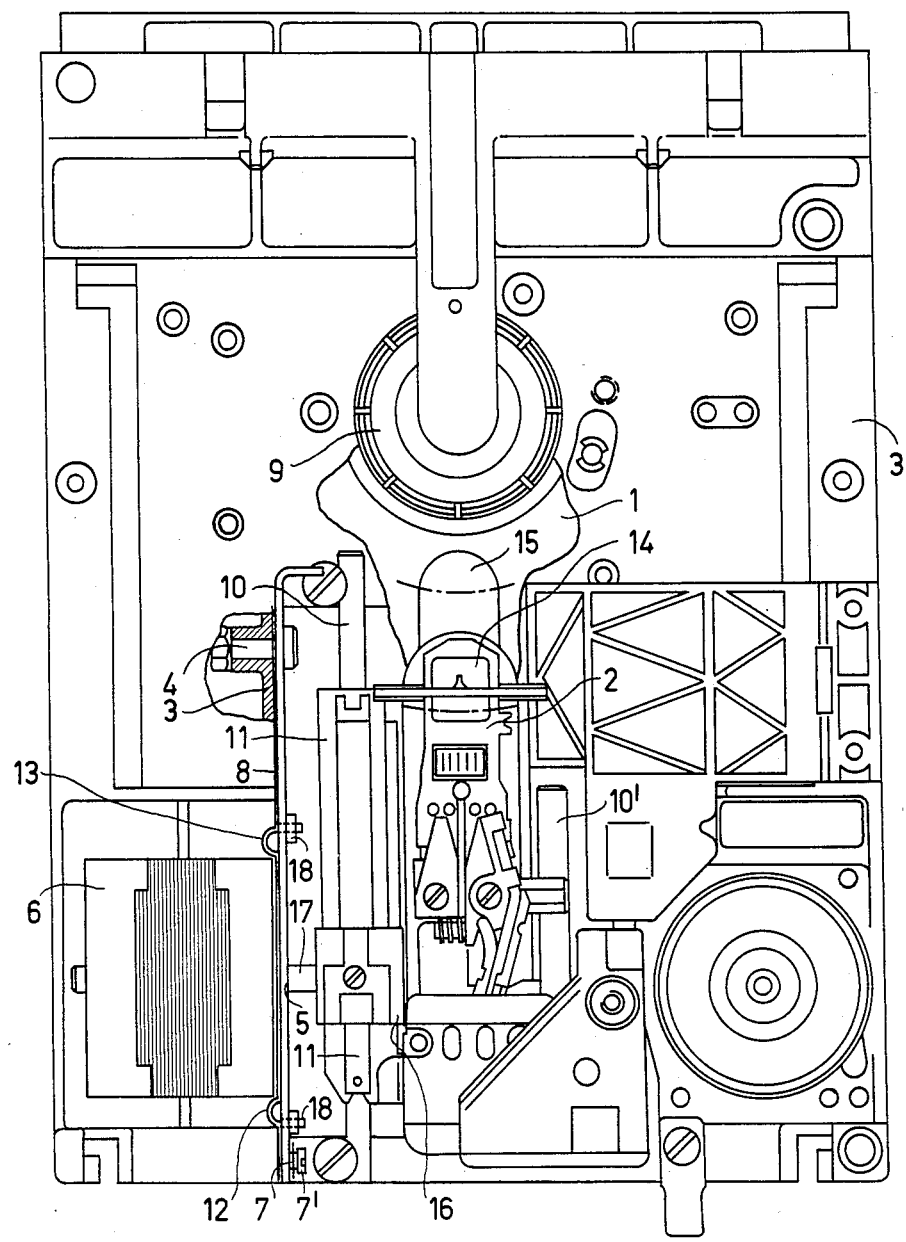

TEMPERATURE-COMPENSATED HEAD POSITIONING DEVICE FOR MAGNETIC DISC STORE

This is a continuation of application Ser. No. 415,516 filed Sept. 7, 1982, now abandoned.

BACKGROUND OF THE INVENTION

The invention relates to a positioning device for the magnetic head of a drive mechanism for a magnetic disc store, which device comprises a stepping motor which is supported in to the chassis of the drive mechanism and whose rotor shaft moves a magnetic-head support in a radial direction relative to the magnetic-disc store.

Such a positioning device is known from U.S. Pat. No. 3,678,481. For positioning the magnetic head the rotor shaft of the stepping motor has been extended and is constructed as a spindle. This spindle cooperates with the magnetic-head support in such a way that, depending on the direction of rotation of the rotor shaft, the support is moved radially across the magnetic-disc store. The stepping motor itself is secured to the chassis of the drive mechanism at a different location than the magnetic-disc store. The chassis is generally made of aluminium or a glass-fibre reinforced plastic.

For exactly recording or reading the information on the magnetic-disc store, it is essential that there be no difference in temperature, which results in different expansions between the drive of the magnetic-head support and the magnetic-disc store. The known construction does not allow complete temperature compensation because the magnetic-disc store and the chassis are made of different materials with different thermal-expansion coefficients. For example, in drive mechanisms for flexible magnetic-disc stores, temperatures of 70° C. to 90° C. occur at the location of the housing of the stepping motor. However, for magnetic discs, a maximum temperature of only 50° C. is permissible, which then virtually corresponds to the maximum permissible chassis temperature.

The stepping motors are arranged behind the magnetic disc store for reasons of magnetism and equipment standards. As a result of this, the magnetic head in known drive mechanisms without temperature compensation may exhibit an outward deviation relative to the track on the magnetic-disc store, which deviations may exceed 30 μm at the specified operating temperature. A reliable operation over the entire temperature range then becomes problematic.

SUMMARY OF THE INVENTION

It is the object of the invention to construct the positioning device for the magnetic head of a drive mechanism for one or more magnetic disc stores in such a way that the heat produced by the stepping motor has no significant influence on the magnetic-head support, so that the deviation of the magnetic head from the track of the magnetic disc store is reduced to an acceptable minimum.

This object is achieved by arranging the stepping motor on a mounting plate made of a material with a small thermal expansion securing, the mounting plate to the chassis of the drive mechanism, and arranging a foil with satisfactory heat-sinking properties (i.e. a good thermal conductor) between the stepping motor and the mounting plate.

A particularly suitable material for the mounting plate of the stepping motor is nickel steel, a so-called Invar alloy. However, a mounting plate of normal steel in conjunction with a copper foil also provides partial compensation.

As a result of the invention, the heating of the stepping motor, which normally gives rise to an expansion of the chassis at the location of the stepping motor, now influences the chassis only so that its expansion between the mounting plate and the spindle for the disk substantially corresponds to the expansion of the magnetic disc-store. However, a complete elimination of the expansion of the chassis as a result of the heat produced by the stepping motor is not desired. Since the thermal behavior of the magnetic storage disc is predetermined and therefore cannot be influenced, complete temperature compensation would again give rise to a difference in thermal expansion of the magnetic disc store and of the magnetic-head support, but now in an opposite sense.

BRIEF DESCRIPTION OF THE DRAWING

An embodiment of the invention will now be described in more detail, by way of example, with reference to the sole drawing which is a plan view of a drive mechanism including a positioning device according to the present invention.

DESCRIPTION OF THE PREFERRED EMBODIMENTS

The FIGURE shows a plan view of a drive mechanism for a magnetic disc store 1. This magnetic disc store 1 is inserted into the drive mechanism from the top, is clamped onto the spindle 9 and is subsequently set into rotation.

The magnetic-head support 2 is slidable on sliding rods 10 and 10' mounted on the chassis 3. The magnetic head 14 is lowered into the operating position on the magnetic-disc store 1 through the aperture 15. On the part of the magnetic-head support 2 above the sliding rod 10 a drive belt 11 is disposed. The belt 11 is wrapped around and secured to a roller 16. The roller 16 is mounted on the rotor shaft 17 of the stepping motor 6.

The stepping motor 6 is not secured directly to the chassis 3 but rather is secured via strip-shaped mounting plate 5 of a material with a low coefficient of thermal expansion, i.e. it expands to a small extent only at higher temperatures. At one end, toward said spindle 9, this mounting plate 5 is rigidly connected to the chassis 3 by connecting means in the form of bolts 4. Suitably, these bolts 4 are arranged to prevent the rotation of the magnetic disc store from being influenced by additional heating. At the other end, away from said spindle 9, the mounting plate 5 is connected to the chassis in a floating manner by connecting means in the form of screw 7' and toothed lock washer 7, so that the slight expansion of the mounting plate 5 has no undesired effect.

It is found that nickel steel is a particularly suitable material for the mounting plate 5 with a low coefficient of thermal expansion.

By the use of a mounting plate 5 with a low thermal expansion compared to the chassis, a substantially better guidance of the magnetic head 14 is obtained. However, materials with a low expansion coefficient also have poor heat-conducting properties, which has an adverse effect in two respects. Firstly, the motor temperature rises very strongly, which inter alia leads to a torque reduction and, secondly, the increased heating leads to a reduced temperature compensation. In order to eliminate both effects a foil 8 with satisfactory heat-sinking properties (i.e., a good thermal conductor) is arranged on the mounting plate between the stepping motor 6 and the mounting plate 5, which are inter-connected by means of screws 18. This foil 8 extends into the connecting means 4 and 7 of the mounting plate 5. Copper foil is particularly suitable for this purpose. Partial compensation by means of this copper foil may already be achieved when the mounting plate 5 is simply made of steel. In order to improve the heat-sinking properties of the foil 8, it is provided with a plurality of cooling fins 12 and 13.

What is claimed is:

1. A drive mechanism for a magnetic disc store comprising
    a chassis having therein a spindle about which said disc store is rotated;
    a magnetic head mounted on a magnetic head support which is movable in a radial direction relative to the magnetic disc store;
    a mounting plate having a low coefficient of thermal expansion, said plate being discrete from said chassis, said plate having one end toward said spindle and an other end away from said spindle, said one end being rigidly connected to said chassis;
    a stepping motor secured to said mounting plate toward said other end, said motor having a shaft which moves said magnetic head support in said radial direction;
    a metal foil having high thermal conductivity on said mounting plate between said stepping motor and said mounting plate, whereby conduction of heat from said motor to said chassis is facilitated.

2. A drive mechanism as in claim 1 wherein said foil extends to said one end.

3. A drive mechanism as in claim 1 wherein said other end of the mounting plate is connected to the chassis in a floating manner.

4. A drive mechanism as in claim 3 wherein said foil extends to said other end.

* * * * *